Nov. 12, 1968     D. L. NORDEEN     3,410,146
ROLLER FRICTION TRANSMISSION

Filed June 20, 1966                         4 Sheets-Sheet 1

INVENTOR.
Donald L. Nordeen
BY
Robert L. Spencer
ATTORNEY

Nov. 12, 1968 D. L. NORDEEN 3,410,146
ROLLER FRICTION TRANSMISSION
Filed June 20, 1966 4 Sheets-Sheet 2

INVENTOR.
Donald L. Nordeen
BY
Robert L. Spencer
ATTORNEY

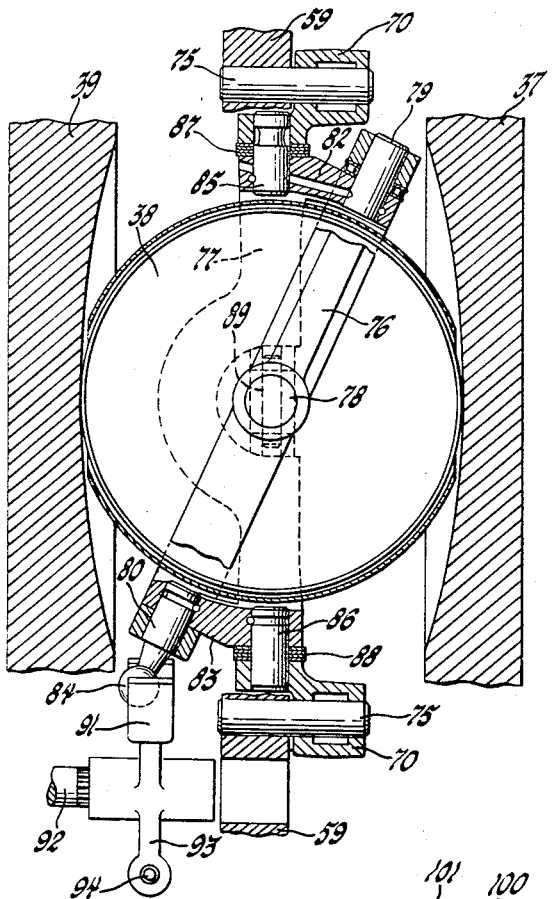

INVENTOR.
Donald L. Nordeen
BY
Robert L. Spencer
ATTORNEY

United States Patent Office 3,410,146
Patented Nov. 12, 1968

3,410,146
ROLLER FRICTION TRANSMISSION
Donald L. Nordeen, Orchard Lake, Mich., assignor to General Motors Corporation, Detroit, Mich., a corporation of Delaware
Filed June 20, 1966, Ser. No. 558,935
9 Claims. (Cl. 74—200)

ABSTRACT OF THE DISCLOSURE

This invention relates to a roller friction transmission constructed and arranged to permit limited axial motion of the spider, cradle and roller carrier relative to the transmission case without upsetting the transmission drive ratio. In addition, the roller carrier is mounted in the cradle with the longitudinal axis of the cradle disposed at an angle to the longitudinal axis of the carrier. The control means for varying the drive ratio is also operatively connected to the cradle by a clevis which accommodates axial motion of the cradle and carrier relative to the ratio control means without upsetting the tilt angle of the carrier relative to the races.

---

This invention relates to friction roller transmissions and more particularly to an improved ratio control system for such transmissions.

Friction roller control systems as heretofore proposed have been commercially unacceptable for many reasons, among which are expense, instability of control, the requirement of very large forces to change roller position with consequent rapid wear of the control linkage, and the requirement of very close manufacturing tolerances in order to maintain precise roller positioning.

The present invention greatly minimizes the forces required to position the rollers, minimizes linkage costs and wear by making possible the use of relatively lightly constructed and inexpensive control linkages, prolongs linkage useful life, and accommodates limited axial motion of the races and reaction support spider without consequent unintentional and undesirable ratio change, and minimizes the requirement for close manufacturing tolerances. In all friction roller transmissions the races are axially loaded against the rollers by large axial loads which cause slight breathing or axial movement of one roller unit or section with respect to another roller unit or section. This breathing is caused by deflection of the races, race-roller contacts, shafts and axial loading mechanism. The herein described structure permits one roller unit assembly to breathe or move axially relative to a second roller unit assembly a limited distance, for example up to .125 inch without consequent ratio change. The structure herein described greatly reduces the conventional close manufacturing tolerance requirements normally necessary to maintain precise roller positioning. In order to minimize the forces required to position the rollers, the rollers are steered from an initial to a desired ratio position rather than moved by brute force.

The system provides mechanism which automatically senses the difference between the desired roller tilt angle and actual roller tilt angle and produces an inclination angle which causes the roller tilt angle to automatically change toward the desired roller tilt angle. The system differs from and is an improvement over systems wherein the tilt angle error causes an inclination velocity or inclination acceleration in that it is more accurate and precise and prevents hunting of the rollers as is common in such control systems. In the present system, if a difference exists between the actual roller tilt angle and the desired tilt angle the control mechanism creates an inclination angle which is a position function of this difference (tilt angle error). For a large tilt angle error a large inclination angle exists while a small tilt angle error generates a small inclination and this relationship of tilt angle error to inclination angle generated is approximately linear. This linear relationship results in improved roller control in that it produces inherent stability in a given ratio and provides a required dynamic response to prevent overshooting or undershooting of the roller position with respect to the desired tilt angle when making a ratio change. Systems where the difference between the desired tilt angle and actual tilt angle (tilt angle error) cause an inclination velocity or inclination acceleration generally require additional structure to obtain the required response and stability. By making the inclination angle produced as a result of tilt angle error a position function of the tilt angle error, response and stability are obtained without the additional structure necessary in conventional constructions.

These and other features of this invention will be apparent from the following description and drawings in which:

FIGURE 5 is a partially sectional view of a master roller and cradle assembly;

FIGURE 6 is a drawing illustrating a drive ratio control shaft for simultaneously controlling the drive ratio of both the front and rear roller units of FIGURE 1;

Figure 1:
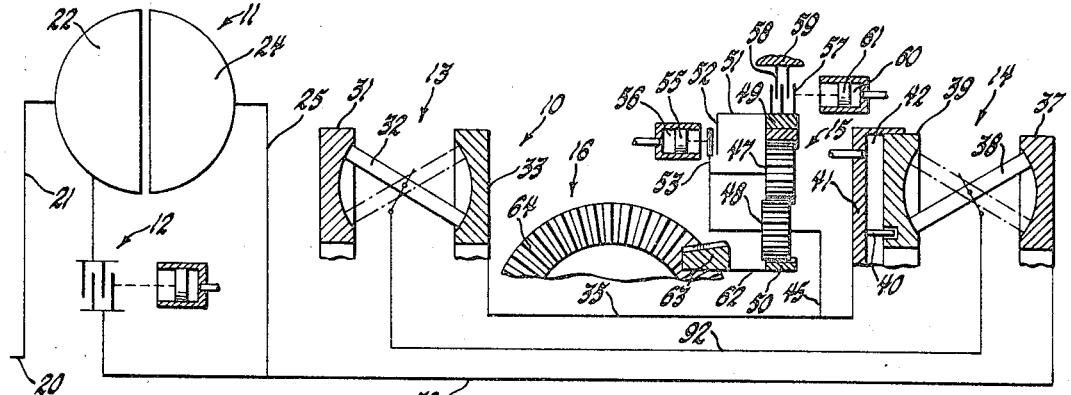
FIGURE 1 is a schematic diagram of a transmission assembly constructed according to the principles of this invention.

Referring to FIGURE 1 there is shown a transmission designated generally by the numeral 10 including a hydrodynamic drive unit which is illustrated as a fluid coupling 11, a friction clutch 12 which may be engaged to lock up the coupling, spaced front and rear friction drive units 13 and 14, planetary gearing indicated generally at 15 and a final power delivery unit 16. The planetary gearing unit 15 and final ouput unit 16 are disposed in the space between the friction drive units 13, 14. Unit 11 may be a hydraulic torque converter rather than a fluid coupling as illustrated.

In FIGURE 1, an engine driven power input shaft 20 drives an impeller 22 through a drum 21. A turbine 24 is connected to a transmission input shaft 30 by a drum 25. Friction clutch 12 is normally released for starting the vehicle through unit 11 and may be engaged to lock up unit 11 after the vehicle is under motion. Front friction drive unit 13 includes a power input race 31 driven by shaft 30, a power delivery race 33 and rollers 32 adapted to be tilted to various positions relative to the races. An intermediate shaft 35 is driven by race 33.

Rear friction drive unit 14 incudes a power input race 37 driven by shaft 30, a power delivery race 39 and a plurality of rollers 38 adapted to be tilted to various selected positions with respect to the races for transmitting torque from race 37 to race 39. A drum 41 fixed for rotation with shaft 35 may form with race 39 a chamber 42 adapted to receive fluid under pressure to provide normal loading (axial thrust) of the races and rollers. Race 39 is axially movable with respect to drum 41 but is pinned to the drum by a pin 40 to drive drum 41. Any method for normally loading the rollers and races may be employed.

It will be apparent that shaft 35 is driven by and rotates as a unit with races 33 and 39 and drives a planet carrier 45. A planetary gearing system includes intermeshing planet pinions 47 and 48 supported in carrier 45, a ring gear 49 meshing with pinion 47 and a power delivery sun gear 50 in mesh with pinion 48. Clutch discs 52 on a drum extension 51 on ring gear 49 may be clutched to clutch discs 53 on carrier 45 through action of a servo piston 55 upon admission of fluid pressure to a servo chamber 56. Brake discs 57 on ring gear 49 may engage brake discs 58 on a permanently grounded drum 59 by means of a servo piston 61 movable in response to fluid pressure in a servo chamber 60. With both the clutch and brake released a positive neutral condition of operation is obtained since no power can be transmitted through the gearing to sun gear 50. With clutch 52–53 engaged ring gear 49 is locked to carrier 45 to provide direct drive through the gearing. With brake 57–58 engaged sun gear 50 is driven in reduction drive in reverse. Sun gear 50 drives a pinion gear 63 through a shaft 62. A final output ring gear 64 mates with gear 63 and may drive a final power output shaft (not shown). A roller phasing shaft 92 extends through shaft 35 and receives shaft 30. Shaft 35 extends through shaft 62 and gear 63. Thus, the coaxial shafts 35, 92, 30 all extend through power delivery shaft 62 and through sun gear 50 and pinion gear 63 for compact structure in the area of the planetary and final delivery gearing. As will hereafter more fully be explained, control shaft 92 may be disposed parallel to shaft 30 rather than coaxial with shaft 30.

Figure 2:
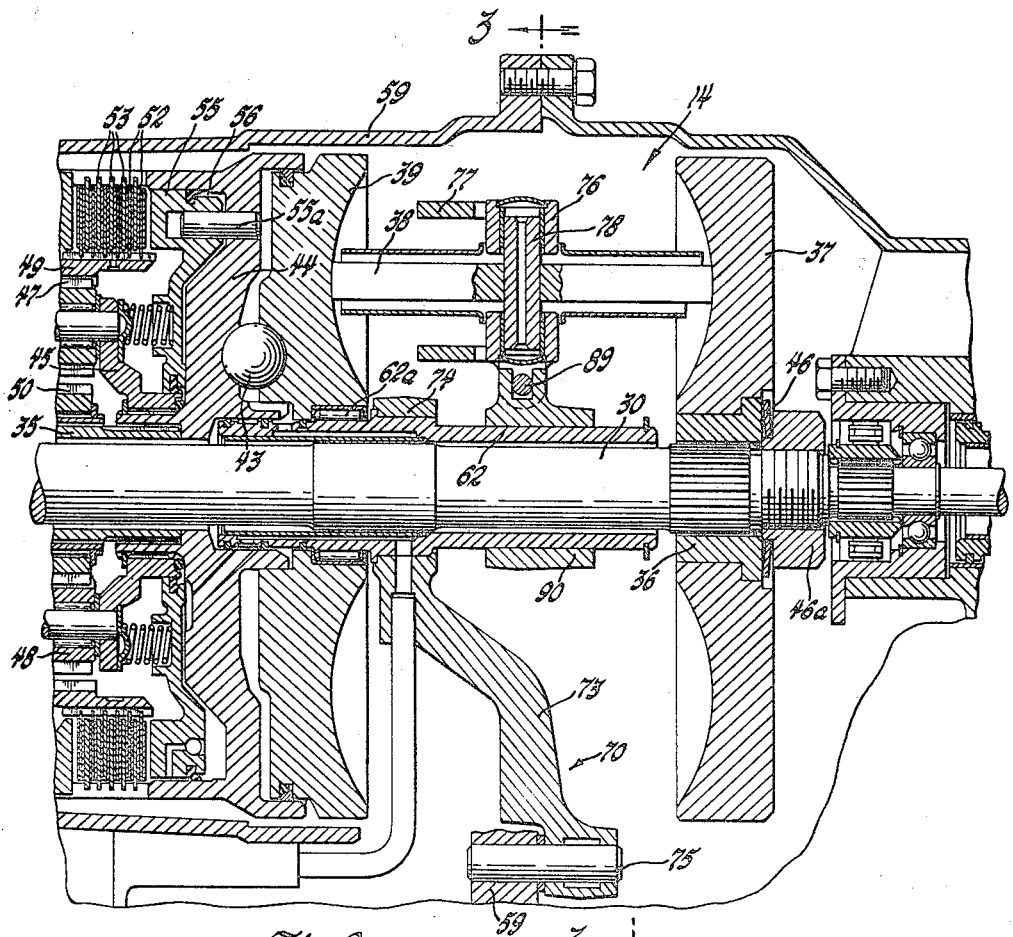
FIGURE 2 is a longitudinal section through one of two similar friction roller units incorporated in the transmission.

In FIGURE 2 the rear friction unit 14 is modified from the schematic diagram of FIGURE 1 to accommodate the use of a roller ratio control shaft 92 offset from and extending between the front and rear roller units as best shown in FIGURES 5 and 6. In FIGURE 2, parts similar to FIGURE 1 are given the same number as corresponding parts in FIGURE 1. In FIGURE 2, races 37, 39 are axially loaded against roller 38 by a Belleville spring 46 disposed between a race support bushing 36 and a nut 46a on shaft 30. A series of balls 43 disposed between race 39 and drum 44 transmit torque from race 39 to drum 44. Clutch plates 52 on ring gear 49 may engage clutch plates 53 or drum 44 through action of piston 55 in response to fluid pressure in chamber 56. Piston 55 may be pinned to drum 44 by a pin 55a. While only a single roller 38 is shown in FIGURE 2, both the front friction roller unit 14 and rear friction roller unit 13 are provided with three rollers.

Figure 3:
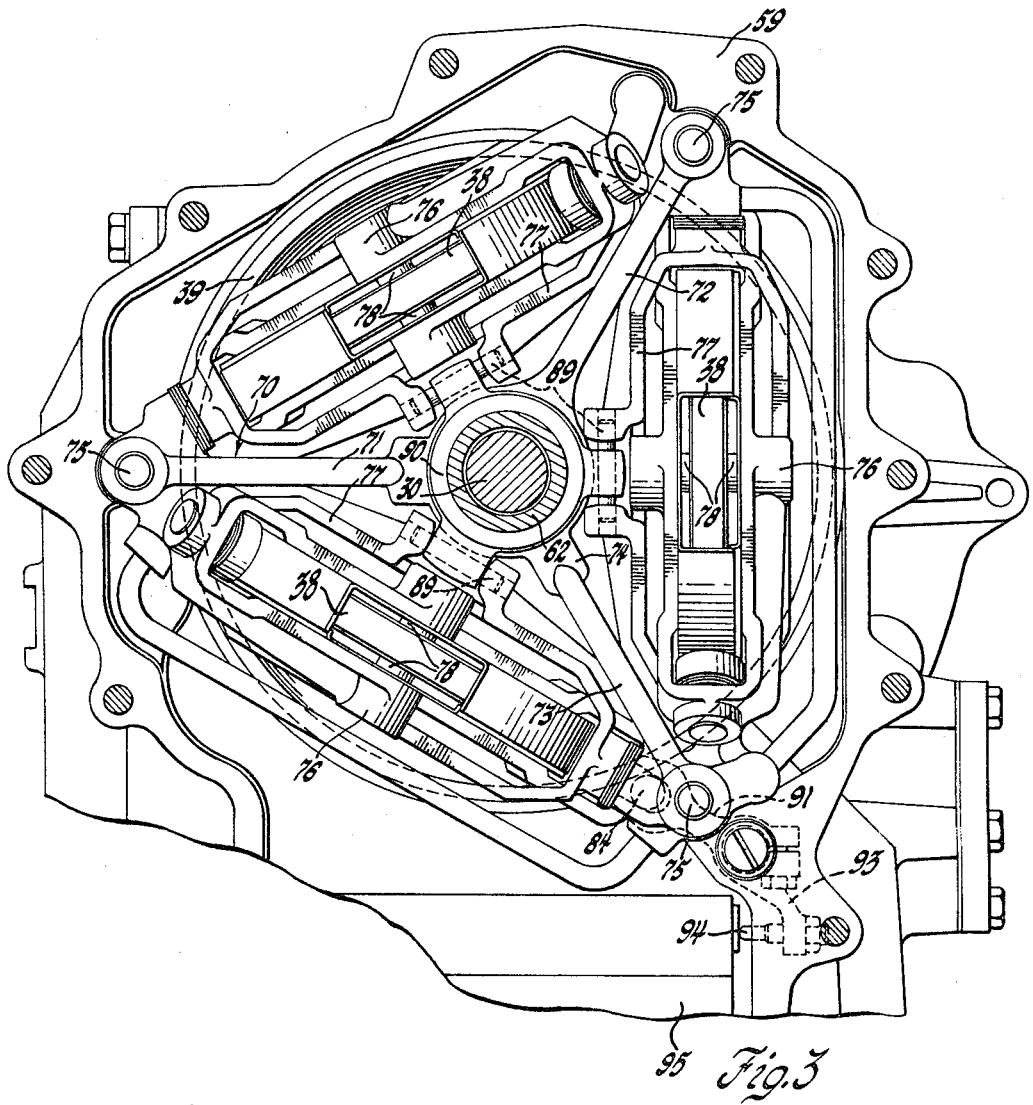
FIGURE 3 is an end view of the friction roller unit of FIGURE 2.

Roller units 14 and 13 are of similar construction and accordingly only the rear unit 14 is described in detail. In FIGURE 3, a support spider 70 includes three equally spaced arms 71, 72, 73 extending outwardly from a central support collar 74. Each arm is grounded to the transmission housing 59 by means of a pin 75 such that spider 70 is capable of axial movement relative to housing 59 but is held against rotation. As best shown in FIGURE 2, a sleeve 62 is directly supported in central support collar 74 of spider 70. Sleeve 62 supports race 39 through a bearing 62a, supports drum 44 and supports a roller phasing collar 90. Shaft 30 extends through support sleeve 62 and is rotatably supported by sleeve 62. The axial position of spider 70 will be determined by the axial position of the races.

Figure 4:
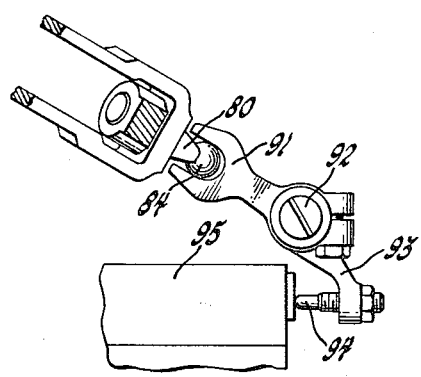
FIGURE 4 is an end view of a clevis for controlling the drive ratio of the roller assembly of FIGURE 3.

The roller unit assembly includes a master assembly and two follower roller assemblies. FIGURE 5, the master assembly is illustrated wherein a roller carrier 76 is supported in a cradle 77 by means of pins 79 and 80 such that the longitudinal axis of carrier 76 is offset from the longitudinal axis of cradle 77 by an angle of 25 degrees to provide a skew axis roller mount. Pins 79, 80 permit carrier 76 to rotate about the pins 79, 80 relative to cradle 77. Cradle 77 is supported in spider 70 by means of pins 85, 86 such that cradle 77 may rotate about pins 85, 86. A thrust bearing 87 is disposed between cradle 77 and spider 70 adjacent arm 82 on cradle 77. A thrust bearing 88 is disposed between cradle 77 and spider 70 adjacent cradle arm 83. Two of the pins 75 by which spider 70 is grounded to case 59 for axial movement relative to case 59 are shown in FIGURE 5. Pin 80 is provided with a ball head 84 extending into a clevis 91 fixed for rotation upon a roller phasing shaft 92. In the assembly, clevis 91 is positioned such that ball head 84 may move axially relative to the clevis 91 without interference and without causing rotation of clevis 91 and shaft 92. An extension 93 on clevis 91 carries a screw 94 adapted to contact a valve member 96 in a valve body 95, as best shown in FIGURE 4, to provide a variable pressure which may vary as a function of ratio position and may be used in a hydraulic control (not shown). Roller 38 is supported in roller carrier 76 by a pin 78.

As best shown in FIGURE 3, cradle 77 of the master cradle and the cradles 77 of each of the two follower rollers are each connected to a roller phasing collar 90 by means of a pin 89. Collar 90 is rotatably supported upon support sleeve 62. It will readily be understood that the two follower rollers of FIGURE 3 are supported in cradle 77 and carrier 76 in the same manner as the master roller of FIGURE 5 with the exception that the ball head 84 of pin 80 will be eliminated from the follower roller support pins 80 since this ball head 84 would serve no useful function. It will also be understood that the front roller unit 13 will be of similar structure to the rear roller unit 14, just described.

Figure 7:
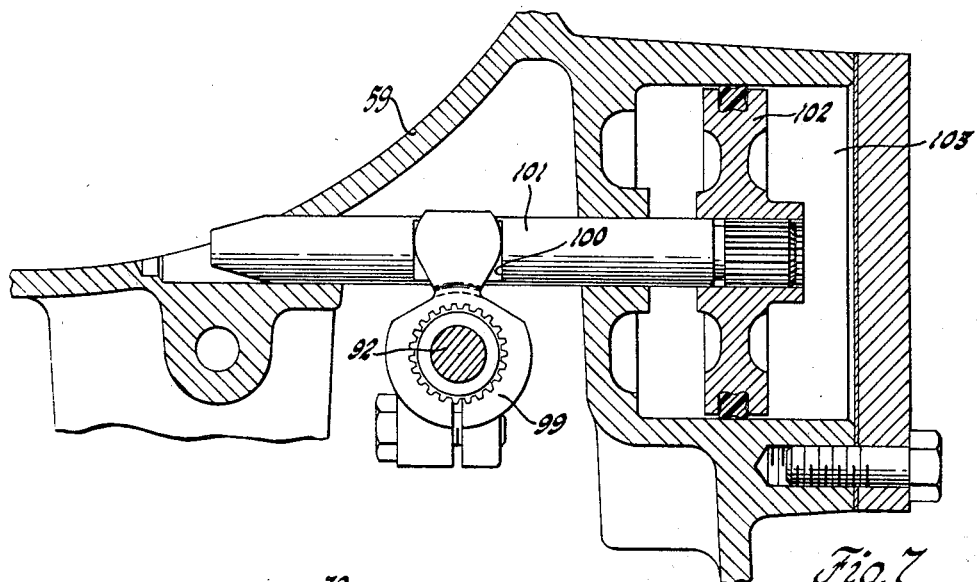
FIGURE 7 is a longitudinal sectional view of a hydraulic servo for controlling the rotation of the control shaft of FIGURE 6.

Shaft 92 shown in FIGURES 5 and 6 is a roller ratio control and phasing shaft extending between rear roller unit 14 and front roller unit 13 for simultaneously controlling the ratio of both units. Shaft 92 is rotatably supported in suitable supports 96, 97, 98 and carries clevis 91 at one end and a clevis 91a at its opposite end. Ball 84 of the rear unit master control assembly is actuated by clevis 91 and a ball 84a of a front unit master control assembly of similar structure to FIGURE 5 is actuated by clevis 91a. A member 99 splined to shaft 92 extends into a slot 100 of a piston rod 101, as best shown in FIGURE 7, and will rotate shaft 92 in response to movement of rod 101. A piston 102 may cause movement of rod 101 in response to fluid pressure in chamber 103. The pressure delivered to chamber 103 may be a metered pressure which varies as a function of engine torque demand and engine speed such that pressure in chamber 103 tends to rotate rod 92 to downshift the drive ratio of both roller units with increase in engine torque demand and tends to upshift the drive ratio of both units in response to increase in engine speed. Such pressure control mechanisms are well known and do not constitute a part of this invention.

Figure 8:
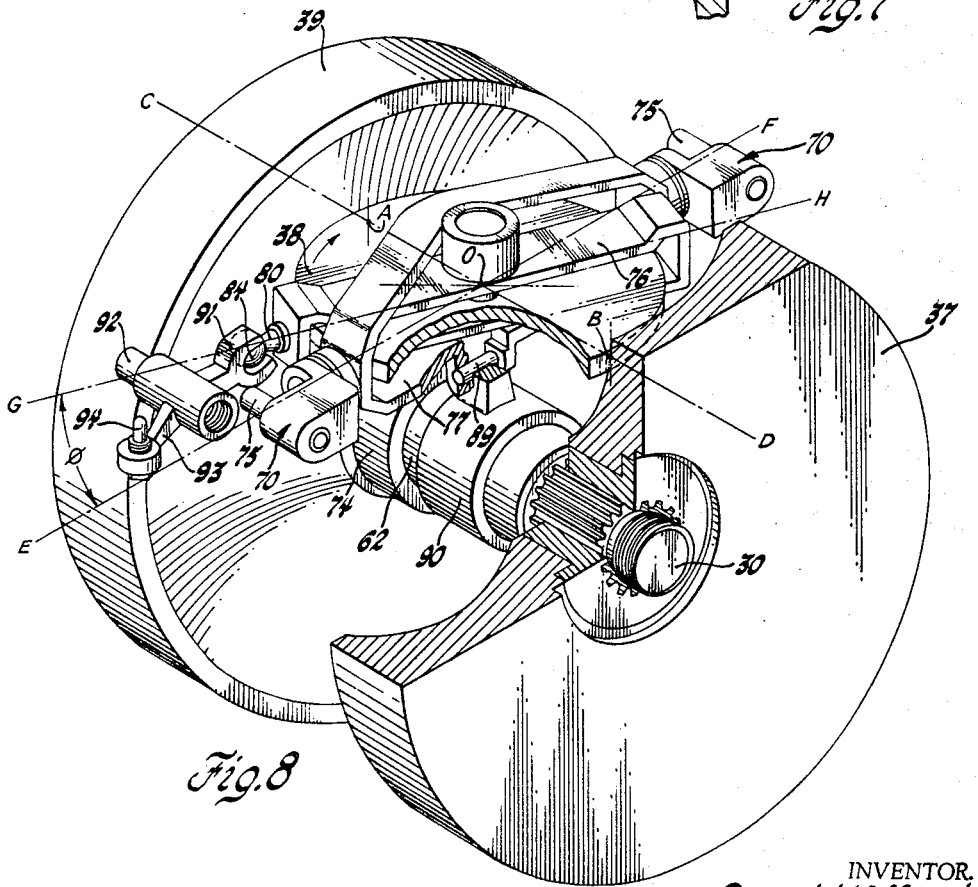
FIGURE 8 is a simplified isometric drawing of a skew axis roller positioning assembly.

For a more detailed description of the relationship of the parts and operation of the device, reference is made to FIGURE 8 which is a simplified isometric drawing of the master roller assembly of one of the friction units. Spider 70 is grounded to the transmission housing (not shown) for limited axial motion with respect to the housing by pins 75. The spider is located axially by axial position of races 37, 39. Axis E–F which passes through roller center O is located in spider 70. Cradle 77 is supported upon axis E–F and contains an axis G–H which makes an angle $\theta$ with axis E–F and also passes through the center O of the roller 38. Carrier 76 is supported on axis G–H and contains the roller shaft bearings. Roller 38 is then supported within carrier 76 by its roller bearings and by its contacts with races 37, 39 on axis A–B. Angle $\theta$ is preferably 25 degrees. Roller center O is located so that it normally lies on axis E–F and such that any line from roller center O intersecting the race center line is perpendicular to axis E–F.

The plane of roller 38 is the plane defined by axes G–H and A–B. The tilt angle is the angle between axis A–B and axis C–D. Axis C–D passes through roller center O and is parallel to the race center line. The inclination angle is the angle between axis E–F and the plane of the roller 38. If the inclination angle is zero, axis E–F lies in the plane of the roller 38 and the actual tilt angle of the roller is the desired tilt angle. Therefore the desired tilt angle is the angle between axis C–D and the plane of axes E–F and G–H.

Considering the action of the control mechanism, first consider a step change in the desired tilt angle. Shaft 92 is rotated such that clevis 91 acting upon ball head 84 of pin 80 causes a rotation of the cradle 77 about axis E–F. This would tend to cause roller carrier 76 and roller 38 to also rotate about the axis E–F. However, roller 38 is restrained by its race contacts A, B, but is free to rotate about these contacts (axis A–B). Roller 38 and roller carrier 76 will therefore rotate about axis A–B so as to satisfy the constraint that axis G–H be common to both the cradle 77 and carrier 76. The rotation about axis A–B in an inclination of the roller which will steer the roller 38 to the desired ratio position. When roller 38 reaches the desired ratio position, axes E–F, G–H, and A–B will all lie in the same plane. The inclination angle will be zero and the roller 38 will remain at the new desired tilt angle.

For a second illustration of the operation of the control mechanism, we fix the cradle 77 in spider 70 and suppose that the actual roller tilt angle is not the desired roller tilt angle called for by the rotary position of shaft 92. This means that the plane of roller 38 does not contain axis E–F. Therefore an inclination angle (angle between axis E–F and the plane of roller 38) exists which will cause the roller tilt angle to change toward the desired roller tilt angle. The mechanism automatically generates an inclination angle which is a position function of the tilt angle error. For a large tilt angle error a large inclination angle exists, while a small tilt angle error generates a small inclination angle. This relationship is approximately linear.

In FIGURE 8, spider 70 supports a support sleeve 62 through which shaft 30 extends. A roller phasing collar 90 is rotatable upon and axially movable upon sleeve 62 along the race center line. Collar 90 is connected to cradle 77 by a sliding pin connection 89. As heretofore explained in connection with FIG. 3, two follower rollers are also connected to roller phasing collar 90 by similar pin connection 89. All rollers have an identical geometric connection to collar 90 which controls the phasing of all of the rollers in a given friction unit assembly. The phasing of the front and rear toric units is accomplished by external control shaft 92 as explained in connection with FIGURE 6. The ball heads 84 and 84a make a sliding connection with clevis 91 and clevis 91a respectively. Control shaft 92 is rotatable about its longitudinal axis which is disposed parallel to the center line of the races. Due to the normal axial loading of the races in friction transmission, the races commonly move or breathe axially a limited amount relative to the transmission housing. Pin mounts 75 of the spider permit spiders 70 to also breathe or move slightly axially so that the roller drive ratio is not upset due to such breathing of the races. Also, as the spiders breathe due to axial deflections of the races, the ball heads 84, 84a will slide axially in their respective clevis. The sides of each clevis between which the ball heads are disposed are disposed parallel to the race center line such that the ball heads 84, 84a may move in their respective clevis 91, 91a without changing the roller tilt angle.

The heretofore described structures provide a novel improved roller control system of the type wherein the roller is steered into its desired roller position rather than forced by brute force to change its position relative to the races. This greatly minimizes the control forces required to control the ratio and to maintain stability of the ratio. It also makes possible the use of much smaller control linkage parts than would otherwise be required thereby avoiding the need for massive and expensive control linkage and prolonging the useful life of the control mechanism. The control system is responsive to command without overshooting or undershooting the roller position as the rollers are moved to a newly selected position. The system is inherently stable and maintains the rollers in a selected position without hunting or roller fluctuation with respect to the races. The inclination angle produced for a given ratio position error is independent of the ratio position and depends solely upon the difference between the desired tilt angle and the actual roller tilt angle. The inclination angle produced causes the actual tilt angle to automatically change toward the desired tilt angle. The inclination angle produced is made a positive function of the difference between the desired tilt angle and the actual roller tilt angle for inherent roller position stability as distinguished from systems wherein the tilt angle error (difference between the desired tilt angle and actual tilt angle) causes an inclination velocity or inclination acceleration and have been found to be relatively unstable. The spider supports are axially movable relative to the transmission housing and the drive ratio control shaft is connected to the carrier and cradle by a sliding connection which permits limited axial movement of the carrier and cradle relative to the control shaft without upsetting the drive ratio. The carrier axis and cradle axis are disposed in a skew axis arrangement with respect to each other at a predetermined angle with respect to each other, preferably 25 degrees.

What is claimed is:

1. In a roller friction transmission, a housing, spaced drive and driven races, a roller in friction contact with said races for transmitting torque from said drive to said driven race and adapted to be tilted with respect to said races, means for supporting said roller including a reaction spider grounded to said housing, a cradle pivotally supported in said spider, a roller carrier supported on said cradle with the longitudinal axis of said carrier disposed at an angle to the longitudinal axis of said cradle, a roller support carried by said cradle and supporting said roller for rotation, and control means operatively connected to said carrier for rotating said carrier relative to said cradle to change the transmission drive ratio.

2. In a roller friction transmission, a housing, spaced drive and driven races, a roller in friction contact with said races for transmitting torque from said drive to said driven race and adapted to be tilted with respect to said races, means for supporting said roller including a reaction spider, pin means for grounding said spider to said housing and permitting axial motion of said spider relative to said housing, a cradle pivotally supported in said spider, a roller carrier supported upon said cradle, a roller support carried by said carrier and supporting said roller for rotation, and control means operatively connected to said cradle for rotating said carrier relative to said cradle to change the transmission drive ratio.

3. In a roller friction transmission, a housing, spaced drive and driven races, a roller in friction contact with said races for transmitting torque from said drive to said driven race and adapted to be tilted with respect to said races, means for supporting said roller including a reaction spider grounded to said housing, a cradle pivotally supported in said spider, a roller carrier supported upon said cradle, a roller support carried by said carrier and supporting said roller for rotation, and control means operatively connected to said cradle for rotating said carrier relative to said cradle to change the transmission drive ratio, said control means including a rotatable clevis having spaced side walls disposed parallel to the center line of said roller and a pin on said cradle having a free end disposed between said clevis side walls and axially movable with respect to said clevis side walls.

4. In a roller friction transmission, a housing, spaced drive and driven races, a reaction spider grounded to said housing, a cradle, pin means supporting said cradle in said spider for rotation with respect to said spider, cradle arms extending outwardly from said cradle adjacent the opposite ends of said cradle and adjacent said pin means, a roller carrier, additional pin means supporting said carrier in said cradle arms, respectively, for rotation relative to said cradle, a roller supported in said carrier and in friction contact with said races, and means operatively connected to one of said cradle arms for rotating said cradle about said cradle pin means.

5. A transmission as set forth in claim 4 including a rotatable clevis having spaced arms disposed parallel to the axis of rotation of said races, an extension on said carrier pin supporting means disposed between said clevis arms, and means for rotating said clevis to change the transmission drive ratio.

6. A transmission according to claim 4 wherein the pin means for supporting said cradle in said spider comprises pins at opposite ends of the longitudinal axis of said cradle and the means for supporting said carrier in said cradle comprise pins at opposite ends of the longitudinal axis of said carrier, the longitudinal axis of said carrier being disposed at a predetermined angle with respect to the longitudinal axis of said cradle.

7. In a roller friction transmission, housing, spaced drive and driven races, a reaction spider, means supporting said spider in said housing for limited axial movement with respect to said housing, a cradle, support means at the opposite ends of the longitudinal axis of said cradle rotatably supporting said cradle in said spider, a roller carrier, support means at opposite ends of the longitudinal axis of said carrier supporting said carrier in said cradle with the longitudinal axis of said carrier disposed at an angle to the longitudinal axis of said cradle, a rotatable drive ratio control shaft, means operatively connecting said carrier to said control shaft for rotating said cradle about said cradle support means upon rotation of said control shaft, and a roller supported for rotation in said carrier and contacting both of said races.

8. A transmission according to claim 7 wherein the longitudinal axes of said carrier and cradle intersect each other at the center of said roller when said roller is in a stable position with respect to said races.

9. A transmission according to claim 7 wherein the means for connecting said carrier to said control shaft includes a slip joint connection permitting free axial movement of said carrier relative to said control shaft.

References Cited

UNITED STATES PATENTS 2,097,633   11/1937   Madle _____ 74—200

FRED C. MATTERN, Jr., *Primary Examiner.*

B. T. CALLAHAN, *Assistant Examiner.*